Nov. 19, 1929. H. A. TOULMIN, JR 1,736,024
PULLEY
Filed April 30, 1928
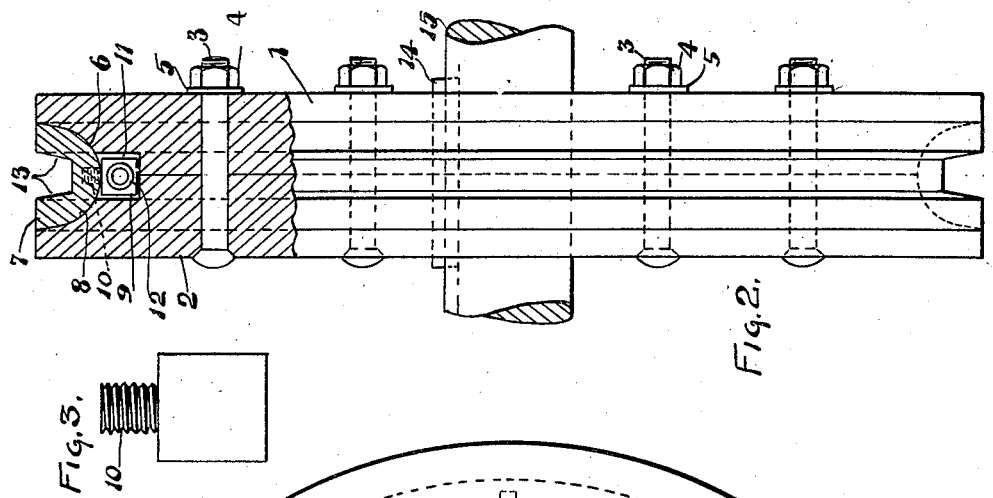
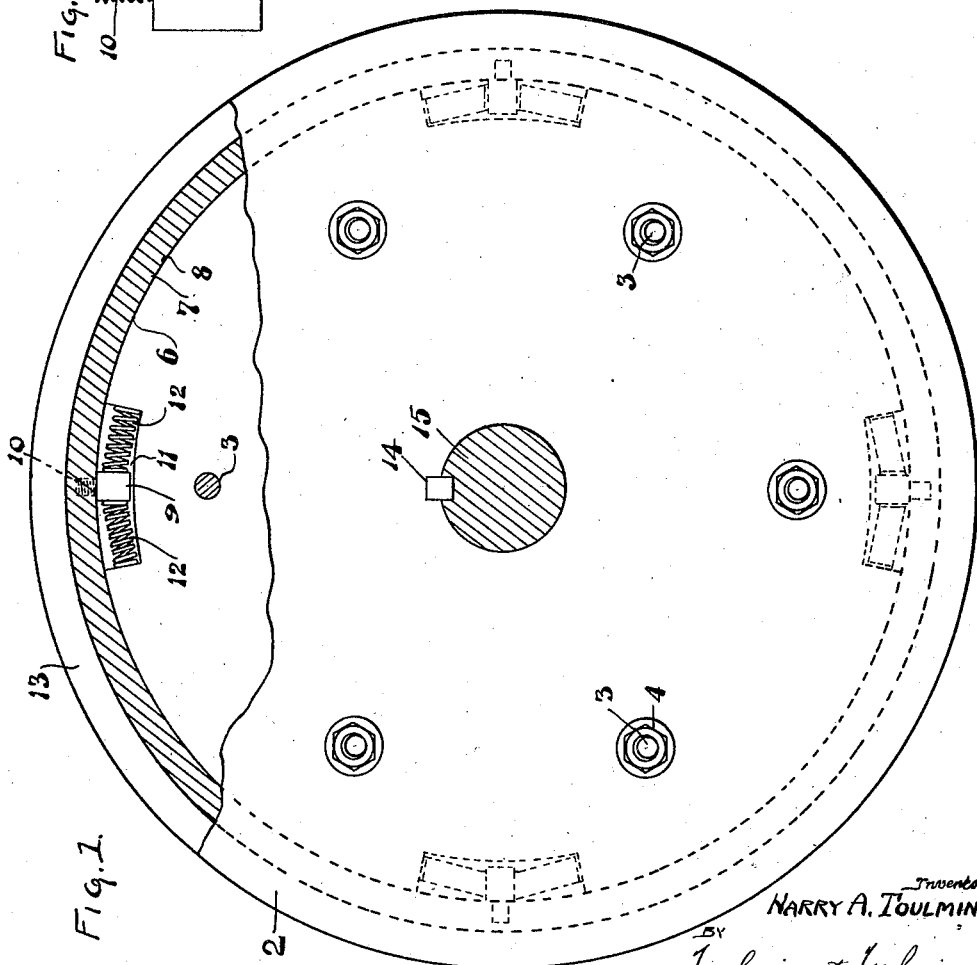

Patented Nov. 19, 1929

1,736,024

UNITED STATES PATENT OFFICE

HARRY A. TOULMIN, JR., OF DAYTON, OHIO, ASSIGNOR TO THE DAYTON RUBBER MANUFACTURING COMPANY, OF DAYTON, OHIO, A CORPORATION OF OHIO

PULLEY

Application filed April 30, 1928. Serial No. 273,867.

My invention relates to pulleys.

It is the object of my invention to provide a pulley adaptable particularly for use with a V-shaped belt of trapezoid section and, in particular, with a raw-edged belt which is composed of rubber and fabric with the edges or sides of the fabric exposed in the side of the belt.

It is a particular object of my invention to provide means by which the variations in load of the initial application of load may be taken up without putting undue strain upon the belt, particularly that type of belt which has a non-extensible, neutral axis and upon which the strains of starting and variation in load are particularly severe due to the lack of extensible or yieldable characteristics of the neutral axis.

Referring to the drawings:

Figure 1 is a side elevation of a pulley partially broken away;

Figure 2 is an end elevation partially broken away;

Figure 3 is a detail of a detachable stop member.

Referring to the drawings in detail, my invention consists primarily of a supporting portion, a belt engaging portion slidable thereon, and means to yieldingly resist the relative movement of the two portions in order that any undue strain or extra load due to starting or applying the load on driving members or driven members may be compensated for by the relative movement between the supporting portion and the belt engaging portion of the pulley.

In the drawings 1 and 2 designate opposite similarly formed halves of a pulley which are joined together by the bolts 3. The nuts 4 and washers 5 serve to retain the halves together on the bolts 3.

The peripheral portions of these halves have a segmental cutaway portion 6, such segments together forming a semi-circular depression in the periphery of the pulley.

This depression is filled by a ring 7 constituting the belt engaging portion of the pulley whose inner face is semi-circular as at 8 to fit within the semi-circular groove of the supporting portions 1 and 2 of the pulley. The frictional engagement between these two portions serves to resist the movement one over the other, but, in order to supplement this frictional resistance and to positively limit the actual amount of relative movement between the parts, I provide the following mechanism.

While I have only shown one of such mechanisms, it will be understood that any number may be employed about the periphery of the pulley depending upon the conditions under which it is operating.

I mount on the inner semi-circular surface of the belt engaging portion of the pulley an inwardly extending lug 9 which is threaded therein by means of the threaded shaft 10. This lug extends into an arcuate cutaway portion 11 formed in the base of the semi-circular groove on the periphery of the supporting portion of the pulley.

Between the sides of the stop 9 and the ends of the arcuate groove 11 I locate helical springs 12 which serve to resist the relative movement between the belt supporting portion of the pulley and the supporting portion of the pulley therefor. This belt supporting portion has a groove for receiving the so-called V-shaped groove, such groove being trapezoid in section and designated 13. The pulley itself is mounted in any desired form, such as by the key 14 on the shaft 15 which supports it.

When the load is first applied, the belt engaging the belt supporting portion 7 will cause it to travel relative to the supporting halves 1 and 2 compressing the spring 12, but, as soon as the load has been taken up and momentum has been gained so that the parts are in running condition, the spring 12 will gradually expand and restore itself to its original neutral position. Variations in load, as where belts and pulleys are driving rock crushers, and rock is suddenly put into the crusher and runs between the jaws, will be likewise taken up, thus relieving the strain upon the belt, preventing the slip of the belt with the consequent generation of heat and deterioration of the belt.

It will be understood that I desire to comprehend within my invention such modifications as may be necessary to adapt it to varying conditions and uses.

Having thus fully described my invention, what I claim as new and desire to secure by Letters Patent, is:

1. In a pulley, a supporting portion formed of oppositely disposed circular halves, a relatively movable belt engaging ring portion, and means for limiting the relative movement of said portions one to the other.

2. In a pulley, a supporting portion formed of oppositely disposed circular halves, a relatively movable belt engaging ring portion, and means for limiting the relative movement of said portions one to the other yieldingly.

3. In combination, in a pulley, a supporting portion having a peripheral groove with arcuate slots therein, a belt engaging portion with lugs in said slots adapted to move therein having an inner face of corresponding section of said groove and an outer face suitably grooved for receiving a belt.

4. In combination, in a pulley, a supporting portion having a peripheral groove, a belt engaging portion adapted to move therein having an inner face of corresponding section of said groove and an outer face suitably grooved for receiving a belt, said groove for receiving the belt being trapezoid in section, the sides of which are adapted to engage with the sides of the belt.

5. In combination, in a pulley, a supporting portion having a peripheral groove, a belt engaging portion adapted to move therein having an inner face of corresponding section of said groove and an outer face suitably grooved for receiving a belt, said groove for receiving the belt being trapezoid in section, the sides of which are adapted to engage with the sides of the belt, and means for limiting the relative movement between the belt engaging portion and the supporting portion therefor.

6. In combination in a pulley, a supporting portion having a peripheral groove, a belt engaging portion adapted to be slidably mounted therein, said belt having an outer belt receiving groove, depending members on the inner side of said belt engaging portion depending into arcuate grooves in the supporting portion, and yielding means interposed between the ends of said grooves and said depending member sides.

7. In a pulley, a pair of adjacent supporting plates having a groove in the outer face thereof formed partially in each of said plates, the outer margins of said plates having side walls for forming the margin of said groove, means of attaching said plates one to the other, a belt engaging ring having an inner wall conforming to said groove, said ring being mounted therein, depending members depending from said inner wall of said ring into arcuate slots formed in the base of said groove in said plates, and yielding means engaging said depending members on either side of the end walls of said groove of said slots.

In testimony whereof, I affix my signature.

HARRY A. TOULMIN, Jr.